June 16, 1931. A. LANGSNER 1,809,855
LEVELING INSTRUMENT
Filed Feb. 20, 1928
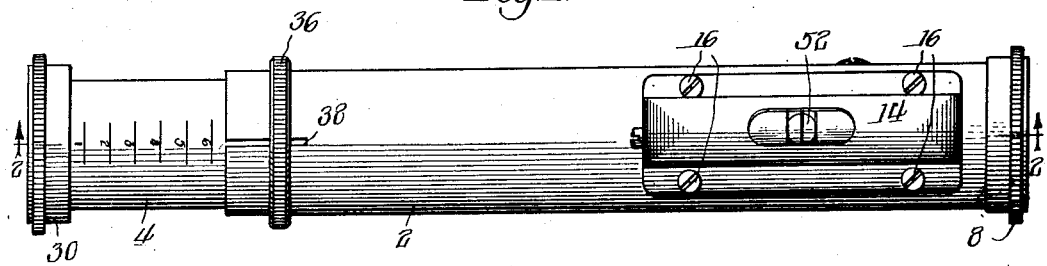
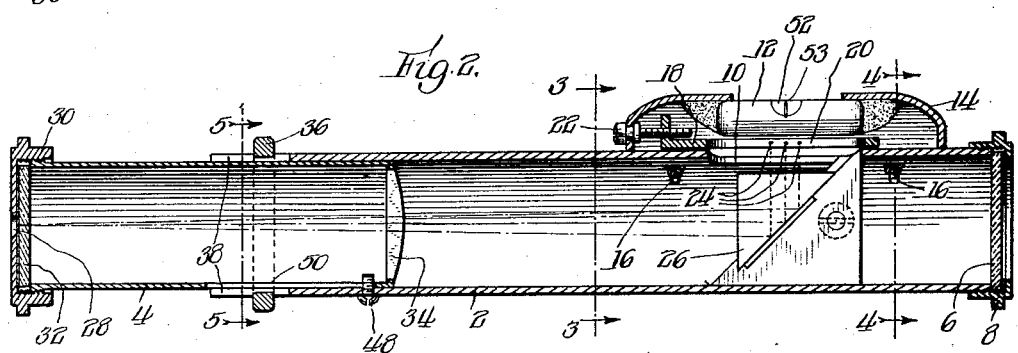
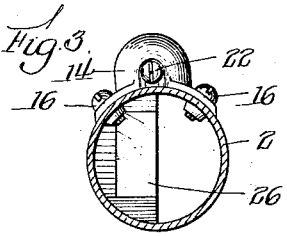 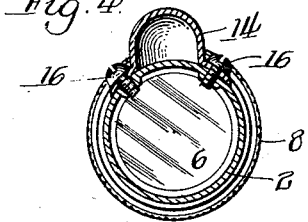
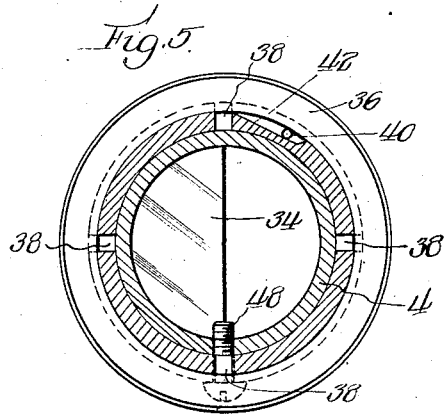 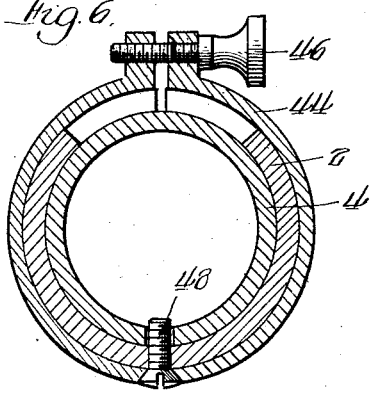
Inventor:-
Adolph Langsner,
By Cheever + Cox
Attys Patented June 16, 1931

1,809,855

UNITED STATES PATENT OFFICE

ADOLPH LANGSNER, OF CHICAGO, ILLINOIS, ASSIGNOR TO EUGENE DIETZGEN COMPANY, OF CHICAGO, ILLINOIS, A CORPORATION OF DELAWARE

LEVELING INSTRUMENT

Application filed February 20, 1928. Serial No. 255,635.

My invention relates to leveling instruments and particularly to leveling instruments of the hand or pocket type.

An object of my present invention is to provide a hand level of convenient size and durable construction which will serve not only to measure elevations and depressions, but also to determine the linear distance of these points of elevation and depression from a given sighting point.

Another object of my invention is to provide a telescopic level of the hand or pocket type to accurately determine elevations and depressions, which is equipped with stadia lines for accurately determining linear distances simultaneously with the level readings.

A further object of my invention is to provide an improved type of spirit level for determining the relative heights of two points, which is provided with stadia lines adapted to be used in reading elevation points on a graduated leveling staff for the purpose of accurately indicating the distance of the leveling staff from the instrument.

It is still a further object of my present invention to provide a telescopic hand level of the spirit type which is provided with a focusing means adapted to be clamped in a fixed position with respect to stadia lines within the instrument, whereby the focus of the instrument may be maintained during continued use thereof.

In addition to the above mentioned desirable characteristics, my invention contemplates the provision of a telescopic hand level which is provided with a prism for reflecting stadia lines to the eye of the user, and when the instrument is sighted upon a given object, such as a graduated leveling staff, these stadia lines serve to accurately determine the lineal distance of the object from the user simultaneously with a determination of the elevation of the object with respect to the point from which the readings are read.

In instances for example where ground is to be leveled within a given radius, it would be advantageous to determine the relative elevation of various surface portions of the ground with respect to a common point within or adjacent said radius, and to also determine contemporaneously with the determination of the relative elevation, the lineal distances between the sighted surface portions and the point common thereto. My invention contemplates the provision of a leveling instrument which may be conveniently carried in the user's pocket and which may be employed in instances similar to the example suggested to determine the elevation of points scattered over the radius or ground area and to determine the distance of each of these points from the point where the readings are taken with the instrument.

These and numerous other objects will be apparent from the following detailed description when considered in connection with the accompanying drawings wherein:

Figure 1 discloses a plan view of a telescopic hand level which embodies features of my invention.

Figure 2 is a longitudinal sectional view taken on line 2—2 of Figure 1.

Figure 3 is a sectional view taken transversely of the instrument on the line 3—3 of Figure 2.

Figure 4 is a similar transverse sectional view taken on the line 4—4 of Figure 2.

Figure 5 is a transverse sectional view taken on the line 5—5 of Figure 2.

Figure 6 is a sectional view similar to Figure 5 and discloses an alternative or modified clamping arrangement, and, Figure 7 is a detail view of the longitudinally slidable bracket detached from the level proper.

Referring now to the drawings wherein like numerals have been employed to designate similar parts throughout the various figures, one embodiment of my invention resides in a leveling instrument which includes a tubular casing 2 which telescopically receives a tubular member 4 at one end thereof. The opposite extremity of the casing 2 is closed by a suitable lens 6, which is secured in position by a clamping ring 8. An upper portion of the casing 2, Figure 2, is formed with an elongated aperture 10 and positioned immediately above this aperture is a spirit level or vial 12. This vial 12 is suitably mounted within and protected by a housing 14 which is secured to the peripheral surface of the casing 2 by means of screws 16. A bracket 18 within the housing 14 is provided with an aperture 20 which simulates the aperture 10 presented in the casing 2, and longitudinal adjustment of the bracket 18 is accomplished by means of a suitable adjusting screw 22. Traversing the aperture 20 in the bracket 18 are three parallel wires 24, Figure 7, and these wires will hereinafter be referred to as stadia wires or lines.

Positioned immediately beneath the vial 12, and suitably mounted within the casing 2, is a prism 26 and it is to be understood that this prism serves to horizontally reflect an image of the three stadia wires 24 to the eye of a user which is normally positioned adjacent a small aperture 28 within a clamping ring 30. The clamping ring 30 is threaded upon the end of the tubular member 4 and secures a lens 32 in position. The opposite extremity of the tubular member 4 carries another magnifying lens 34 which is interposed between the lens 32 and the prism 26. By moving the tubular member 4 with respect to the casing 2, the image of the three stadia wires may be focused, and to positively secure the member 4 in position with respect to the casing 2 after the instrument has been properly focused I provide a conveniently operable clamping ring 36. It will be noted that the extremity of the casing 2 which receives the clamping ring 36 is provided with four equally spaced slots 38 and these slots 38 render the extremity of the casing sufficiently resilient to permit the clamping thereof against the outer surface of the tubular casing 4. This clamping action is accomplished by partially rotating the ring 36, and by referring to Figure 5 it will be seen that this ring cooperates with a roller 40 and a cam surface 42 to effectively clamp the quadrant portions of the casing 2 extending between the slots 38 against the surface of the tubular member 4. Graduations are provided on the surface of the tubular member 4, Figure 1, to facilitate the proper longitudinal positioning of the member 4 with respect to the casing. A modified form of clamping ring 44 is disclosed in Figure 6, and it will be observed that this clamping ring 44 is rendered effective through the agency of a thumb screw 46. The turning of the thumb screw 46 operates to compress the casing in the manner just described in connection with the operation of the clamping ring 36 to secure the tubular member 4 in proper position. To prevent relative rotation between the tubular member 4 and the casing 2 I provide a screw 48, Figures 2 and 6, which extends through a longitudinal slot 50 within the member 4. The member 4 is thus held against rotation but may be moved longitudinally within the limits determined by the length of the slot 50.

It will be noted that the magnifying lens 34 and the prism 26 occupy substantially half of the cross sectional area of the tubular member 4 and the casing 2 respectively, as clearly shown in Figures 3 and 5. Thus when an observer looks through the opening 28 of the instrument and sights a distant object, half of the cross sectional area within the instrument to the right thereof, Figures 3 and 5, will present a clear unobstructed vision of the object through the lenses 32 and 6. The other half of the cross sectional area will present to the observer an image of the three transverse stadia wires 24, the lens 34 in this instance serving to magnify these stadia wires or lines. As already described, in order to bring the image of these lines into focus it is only necessary to apply a releasing movement to the clamping ring 36 and then longitudinally adjust the position of the tubular member 4 within the sleeve 2. When the instrument occupies a level position, it will be understood that the bubble 52 within the vial 12 will occupy a central position with respect to an indicator line 53 suitably etched across the upper surface of the vial. The reflected image of the bubble as viewed by the observer through the agency of the prism 26 should be centrally positioned with respect to the three stadia lines 24. That is to say, the middle line 24 should be seen as passing transversely of the medial portion of the bubble image. If it is found after the instrument has been horizontally positioned that the image of the stadia lines 24 is not centrally positioned with respect to said bubbles, a slight adjustment of the screw 22 will serve to adjust the bracket 18 which carries these lines, and thereby properly position said lines with respect to the level or true horizontal position of the instrument. At this point of the description it is to be understood that the stadia lines 24 are spaced so that when the images thereof are viewed by the observer as a reading is being taken upon a conventional graduated level rod or staff (not shown), the distance or number of graduations which appear to the observer as being included between the two outermost lines 24 will be proportional to the lineal distance between the observer and the position of the leveling rod. For example it has been found practical in certain instances to arrange the stadia lines 24 in such a manner that when the observer sights the graduated scale of a leveling rod placed at a distance of 20 feet from the instrument, the space between the outer, or in other words the upper and lower images of the stadia lines will embrace a distance or length of one foot upon the leveling rod. Under such circumstances it will be apparent that the distance between the center line and either of the outer lines of the image within the prism will embrace or include a distance on the leveling rod of six inches. Obviously if the leveling rod is located at a distance 40 feet from such an instrument, the number of graduations or portion of the leveling rod included between the images of the outer stadia lines 24 will be twice as great as the distance embraced by said lines when the leveling rod is positioned at a distance of 20 feet from the instrument. Although in the present illustrated embodiment of my invention I have merely indicated three stadia lines having a predetermined spaced relation, it is to be understood that any desired number of stadia lines may be employed which are arranged in various spaced relations to meet the particular needs for which the instrument is to be used.

To obtain a clear understanding of the practical application and use of my invention, assume that a certain plot of ground is to be leveled and that it is desirable to stake out or plot various portions of the ground area to determine how much soil should be filled in or leveled off. In such instances it is only necessary for the user of my improved leveling instrument to select a certain location and then make a plurality of successive observations or readings upon a conventional leveling rod positioned at the points where it is desired to determine elevations with respect to the point from which the observations are made. Assume for example that the eye of the observer is positioned 5 feet above the ground portion at the point where the observer stands, and that it is desired to take readings at distances, as for example, 20 or 30 feet from the observer. When the images of the stadia lines 24 within the instrument embrace a distance on the graduated scale, held by the assistant, which is equivalent to one foot, the observer is apprised of the fact that the leveling rod is now positioned exactly 20 feet from the instrument. The instrument is leveled by adjusting the instrument so as to bring the image of the middle stadia line medially of the image of the bubble 52. If the graduation sighted upon the leveling rod when the instrument is thus leveled is found to be more than five feet above the ground portion upon which the leveling rod stands, it will obviously indicate a depression in the ground, and likewise if the distance read upon the graduated leveling rod is less than 5 feet it will indicate that the portion of the ground is elevated with respect to the level of the ground upon which the observer stands. From the foregoing description of the practical application of my invention it will be understood the invention contemplates the provision of a conveniently constructed hand level which may be used for determining the relative heights between two points, and also provides means whereby lineal distances may be determined contemporaneously with the leveling readings. In other words, elevations at a plurality of positions may be determined and the distance of these elevations from the sighting point instantly observed. By providing the means residing in the clamping ring 36, Figure 5, or the clamping ring 44, Figure 6, for securing the tubular member 4 in fixed position with respect to the casing 2 when the instrument has been brought into focus with the eye of the observer so that the superimposed images of the bubble 52 and the stadia lines 24 are clear and distinct, said focus will not be disturbed as the instrument is carried about from place to place and subjected to the wear incident to the use of such instruments.

Although I have illustrated a leveling instrument embodying features of my invention which has a particular or predetermined arrangement and spacing of the stadia lines and a particular type of prism, it is to be understood that my invention is capable of other modifications without departing from the scope thereof.

Having thus described my invention what I claim as new and desire to secure by Letters Patent is:—

A hand level of the class described including a tubular casing, a second casing telescopically arranged within the first casing, manually operable means for pressing the first casing into engagement with the peripheral surface of the second casing for securing said parts in various positions of adjustment, a lens mounted at one extremity of the first mentioned casing, a second lens spaced from the first mentioned lens and movable with the second casing, an angularly disposed reflector positioned between said lenses, said first mentioned casing having an aperture positioned immediately above said reflector, an apertured frame positioned above said aperture, a plurality of stadia wires arranged in predetermined spaced relation and extending across the aperture of said frame, a housing detachably mounted upon the upper surface of said first tubular casing, a single screw extending through one extremity of said housing and providing the sole adjustable support for said apertured frame, a spirit level vial mounted in a fixed position within said housing immediately above the aperture of the frame, said spirit level vial having an indicator line provided thereon which is cooperatively positioned with respect to the stadia wires carried by the frame, and means within said first tubular casing for supporting the reflector in proper reflecting position.

In witness whereof, I have hereunto subscribed my name.

ADOLPH LANGSNER.